United States Patent [19]
Dellian

[11] Patent Number: 4,618,674
[45] Date of Patent: Oct. 21, 1986

[54] RED-1-(CYANOPHENYLAZO- OR CYANO, HALOPHENYLAZO)-2-AMINO-8-HYDROXYNAPHTHALENE-6 SULFONIC ACID DYESTUFFS

[76] Inventor: Kurt A. Dellian, 2101 Wakefield Rd., Greensboro, N.C. 27410

[21] Appl. No.: 567,295

[22] Filed: Dec. 30, 1983

[51] Int. Cl.⁴ .................... C09B 29/01; C09B 29/30; C09B 67/22; D06P 1/39
[52] U.S. Cl. .................................. 534/878; 534/573; 534/728; 534/831
[58] Field of Search .......................................... 534/878

[56] References Cited

U.S. PATENT DOCUMENTS

| | | | |
|---|---|---|---|
| 2,105,862 | 1/1938 | Knecht et al. | 534/878 |
| 2,714,103 | 7/1955 | Conzetti | 534/878 |
| 3,936,266 | 2/1976 | McLeod | 534/878 X |
| 4,002,607 | 1/1977 | McLeod | 534/878 |
| 4,146,363 | 3/1979 | Harms et al. | 534/878 |
| 4,312,808 | 1/1982 | Lienhard et al. | 534/878 |

FOREIGN PATENT DOCUMENTS

| | | | |
|---|---|---|---|
| 1041911 | 10/1958 | Fed. Rep. of Germany | 534/878 |
| 2623178 | 2/1977 | Fed. Rep. of Germany | 534/878 |
| 42-9796 | 5/1967 | Japan | 534/878 |
| 196345 | 6/1938 | Switzerland | 534/878 |
| 794135 | 4/1958 | United Kingdom | 534/878 |
| 1373928 | 11/1974 | United Kingdom | 534/878 |
| 1579414 | 11/1980 | United Kingdom | 534/878 |

Primary Examiner—Floyd D. Higel
Attorney, Agent, or Firm—Edward McC. Roberts; Kevin T. Mansfield

[57] ABSTRACT

Red monoazo dyestuffs from diazotized 1-aminobenzonitrile or 1-amino-4-, 5- or 6-halo-benzonitrile and 2-amino-8-hydroxynaphthalene-6-sulfonic acid. These dyes are particularly distinguished by their good migration and leveling properties and excellent fastness to light. Said dyestuffs are moreover suitable for obtaining very even combination dyeings together with known blue, yellow and orange acid dyestuffs. These dyestuffs are particularly suited for the dyeing of carpeting, upholstery fabrics and drapery materials.

5 Claims, No Drawings

RED-1-(CYANOPHENYLAZO- OR CYANO, HALOPHENYLAZO)-2-AMINO-8-HYDROXYNAPHTHALENE-6 SULFONIC ACID DYESTUFFS

DETAILED DISCLOSURE

This invention relates to new red monoazo dyestuffs, a process for the production thereof, their use for the dyeing or printing of organic fiber material, particularly fiber material made from natural or synthetic polyamide, as well as the fiber material dyed or printed with the new dyestuffs.

It has long been recognized in the art that due to irregularities in the affinity of synthetic polyamide for acid and direct dyestuffs, level dyeings have been difficult to attain with these dyestuffs. Thus dyestuffs and dyeing processes which will tend to cover up the yarn variations have been sought by dyers and dye manufacturers. Dyestuffs which have good migration properties are better able to fulfill this requirement: the better migration properties, the better the cover-up of the yarn variations.

Good migration and leveling properties also give the dyestuff other advantages in the application of the dyestuffs. They allow a relatively rapid rate of exhaustion. Good migration properties are especially important for dyeing in a jigger. Dyestuffs with good migration properties also have the advantage of being more readily combinable for trichromatic color combinations (red-/yellow/blue). Good leveling properties in the dyebath also mean that faulty dyeings may be corrected much easier, which also means a reduction in dyeing time and costs.

It has been found that new red monoazo dyestuffs which have particularly good migration and leveling properties are of the formula:

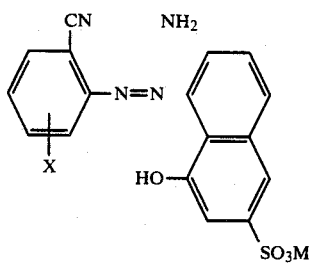

in which
X is hydrogen or halogen, and
M is a colorless cation.

The dyes of this invention are obtained when a diazotized diazo component of the formula:

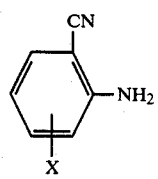

wherein X has the meaning given above, is coupled, in a neutral to acid medium, with a coupling component of the formula:

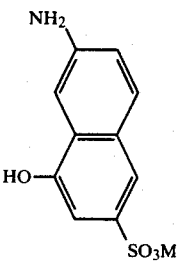

wherein M has the meaning given above. The coupling component in its acid form is known as "gamma acid" or 2-amino-8-naphthol-6-sulfonic acid.

M in the meaning of a colorless cation represents, for example, hydrogen, an alkali metal cation, such as a calcium, lithium, sodium or potassium cation, or the ammonium cation. M preferably is the sodium cation.

The combination of good migration and leveling properties, discussed above is also particularly important in dyeing by continuous operations such as padding. The dyestuffs of this invention are particularly good in a process of trichromatic dyeing by padding. In trichromatic dyeing it is very important that the selected red, yellow and blue dyes build together to give consistent, even and level shades. The red dyes of this invention have been found to be exceptionally good in continuous trichromatic dyeing processes.

Particularly good trichromatic dyeings have been achieved with the dyes of this invention and a combination of the blue dye of the structure

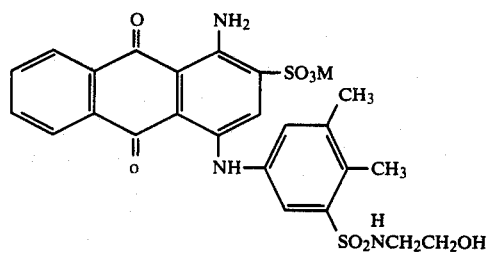

and the yellow dye of the structure

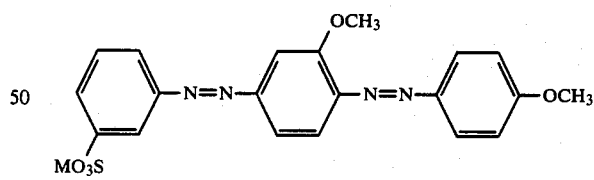

or the orange dye of the structure

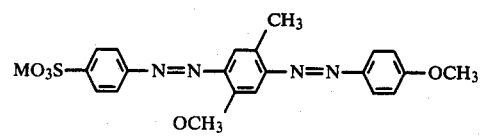

wherein M is a colorless cation.

The blue dye of the above structure is known from U.S. Pat. No. 3,778,453, which issued Dec. 11, 1973 on application of Peter Hindermann and Hubert Meindl. The above yellow and orange dyes are known from U.S. Pat. No. 3,862,119, which issued Jan. 21, 1975 on application of Hans Alfred Stingl. It is particularly demanding of good migration and leveling properties to produce consistent and even trichromatic dyeings by padding at room temperature. The dye of the invention in combination with the above disclosed blue and yellow or orange is excellent for room temperature padding, giving outstanding level and consistent shades.

Examples of useful diazo components are 2-aminobenzonitrile (also called anthranilonitrile), 5-chloroanthranilonitrile and 5-bromoanthranilonitrile. Of less interest, but still useful are 4- and 6-chloro(or bromo)anthranilonitrile.

Coupling is carried out in a neutral to acid medium in a manner known per se, preferably in weakly acid, aqueous solution.

Isolation of the monoazo dyestuffs according to the invention is advantageously effected by salting out with sodium chloride or potassium chloride, subsequent filtering, washing and drying.

The dyestuffs of this invention, in the form of their alkaline earth metal, alkali metal or ammonium salts are brownish-red to dark brown powders which are easily soluble in water; more particularly, in solutions of said dyestuffs, prepared with warm water, are stable, highly fluid and easily filterable after cooling. Therefore, such solutions are especially suitable for the dyeing and printing with cold concentrated dye liquors. With the dyestuffs according to the invention, organic fiber material can be dyed or printed in red shades; the dyeings or prints obtained therewith have very good migration and leveling properties as well as good to excellent fastness to light. Although these dyestuffs are at least moderately fast to wet processing, this property can be improved by aftertreatment as is known in the industry. In most cases, however, this is not necessary since the main use for these dyestuffs is for the dyeing of carpeting, upholstery fabrics and drapery materials, where such wet-fastness is not required. The dyestuffs of this invention are also stable to boiling and yield non-streaky dyeings especially on textured synthetic polyamide fiber material. Cellulose fibers and polyolefin fibers which have not been basic modified are well reserved by the dyestuffs of this invention. Finally, the dyestuffs according to the invention together with known blue or yellow acid dyestuffs, are suitable for obtaining very even combination dyeings. Especially valuable yellowish-red dyeings are obtained when using dyestuffs of this invention with known scarlet monoazo dyestuffs containing sulfonic acid groups.

Examples of organic fiber material which can be dyed or printed with the dyestuffs according to the invention are: basic modified polyolefin fibers such as basic modified polyethylene and polypropylene fibers, e.g. Meraklon DR, DL or DO, as well as polyurethane fibers, particularly, however natural or synthetic polyamide fibers.

As fiber material made from natural polyamide, expecially wool but also silk can be used. Examples of fiber material made from synthetic polyamide which can be dyed or printed with the dyestuffs according to the invention, are: condensation products from hexamethylene diamine and adipic acid (Polyamide 6.6) or sebacic acid (Polyamide 6:10) or mixed condensation products, e.g. those from hexamethylene diamine, adipic acid and e-caprolactam (Polyamide 6.6/6), also polymerization products from e-caprolactam (Polyamide 6), for instance those known under the trade names Perlon, Grilon or Enkalon, or polymerization products from w-aminoundecanoic acid (Polyamidell), e.g. that known under the trade name Rilsan.

The organic fiber material can be dyed or printed in any chosen form in a manner known per se, according to the exhaustion process or continuously by impregnating it with aqueous, aqueous-organic or organic dye solutions and subjecting the impregnated material to a subsequent heat treatment.

EXAMPLE 1

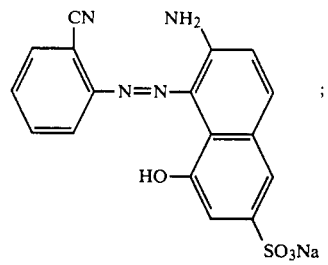

One mole (118.1 g.) of anthranilonitrile was stirred with 1.1 mole of con. hydrochloric acid to form a thick white paste. Chipped ice (500 g.) was added to the paste to give a temperature of 0°-5° C., followed by a slight excess of sodium nitrite (70.0 g.) added, with stirring over a 15-min. period as a 30% aqueous solution. Stirring was continued for 1 hr. while the temperature was maintained at 0°-5° C. Any unreacted nitrous acid (as indicated by PI starch paper) was destroyed by the addition of sulfamic acid. Coupling was then effected by the addition of an aqueous solution of gamma acid, to the resulting diazonium salt solution, with stirring, over a 20–30 min. period. while the reaction temperature was allowed to rise to room temperature. The gamma acid solution was prepared by dissolving 263.1 g. (1.1 moles) of gamma acid in 500 ml. water, containing 40.0 g. sodium hydroxide, followed by a pH adjustment to about pH 5.0 with glacial acetic acid. After the addition of the gamma acid solution to the diazonium salt solution was complete, stirring was continued for about 2 hours.

The resulting red dye was collected by filtration, washed with brine and dried. Yield, 334.0 g., 95% of theory. The dye showed a strong absorption at $\lambda$max 515-532 m$\mu$.

A similar red dye could be obtained by substituting an equivalent amount of 5-chloroanthranilonitrile for the anthranilonitrile of this Example.

EXAMPLE 2

A tufted carpet of polyamide 6 or 66 was padded with a liquor pick up of 300% with a dye liquor containing 5 g/l of the dye of Example 1. The carpet was then steamed for 15 minutes at a temperature of 98°-100° C. The dyed carpet was then rinsed with cold water and dried. A red carpet, dyed evenly and well throughout, of very good lightfastness, was obtained.

EXAMPLE 3

Following the procedure of Example 2, but using instead a dye liquor containing 5 g/l of a 1:2:1 mixture of red: yellow or orange dyes gave an even, trichromatic beige-brown dyeing of good lightfastness. For this Example, the red dye was that of Example 1, the blue dye was of the structure.

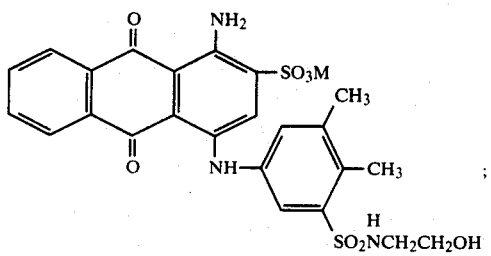

and yellow dye was of the structure

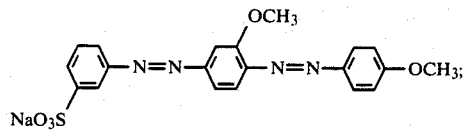

where an orange dye was substituted for the yellow dye, it was of the structure

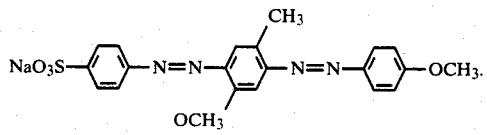

EXAMPLE 4

A wool fabric was dyed in a liquor ratio 30:1 in a dye bath containing 1% of the dye of Example 1 and 3% formic acid (85%). The fabric was entered at 50° C. in the dye bath and the temperature raised to the boil within 30 minutes and kept boiing for 45 minutes. A pure red dyeing on the wook was obtained with complete exhaustion of the dye bath. The dyeing had excellent levelness, good fastness to wet processing and excellent lightfastness.

Similar results were obtained where polyamide 6 was used in place of the wool fabric of this Example.

What I claimed is:

1. A dye of the formula

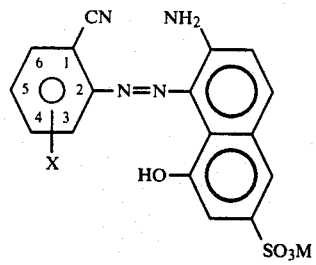

wherein X is hydrogen or halogen and M is a colorless cation.

2. A dye of claim 1 wherein M is hydrogen, alkali metal or ammonium.

3. A dye of claim 1 wherein X is hydrogen and M is hydrogen or sodium.

4. A dye of claim 1 wherein X is 5-chloro.

5. The dye of claim 1 wherein X is hydrogen and M is sodium.

* * * * *